(12) United States Patent
Zhang et al.

(10) Patent No.: US 11,893,180 B2
(45) Date of Patent: Feb. 6, 2024

(54) DISPLAY DEVICE AND METHOD FOR CONTROLLING THE SAME

(71) Applicants: Chengdu BOE Optoelectronics Technology Co., Ltd., Sichuan (CN); BOE TECHNOLOGY GROUP CO., LTD., Beijing (CN)

(72) Inventors: Bing Zhang, Beijing (CN); Ping Luo, Beijing (CN); Xuan Luo, Beijing (CN); Zhongjie Wang, Beijing (CN); Mengyue Fan, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/922,013

(22) PCT Filed: Oct. 11, 2021

(86) PCT No.: PCT/CN2021/123072
§ 371 (c)(1),
(2) Date: Oct. 28, 2022

(87) PCT Pub. No.: WO2022/100332
PCT Pub. Date: May 19, 2022

(65) Prior Publication Data
US 2023/0176685 A1    Jun. 8, 2023

(30) Foreign Application Priority Data
Nov. 11, 2020  (CN) .......................... 202011255236.1

(51) Int. Cl.
*G06F 3/041*    (2006.01)

(52) U.S. Cl.
CPC ............... *G06F 3/04166* (2019.05); *G06F 2203/04102* (2013.01)

(58) Field of Classification Search
CPC ...... G06F 1/1652; G06F 3/041; G06F 3/0412; G06F 3/0416; G06F 3/04164;
(Continued)

(56) References Cited

U.S. PATENT DOCUMENTS 9,779,653 B2 * 10/2017 Ikeda ..................... G06F 1/1652
9,805,659 B2 * 10/2017 Ikeda ..................... G09G 3/3275
(Continued)

FOREIGN PATENT DOCUMENTS

CN    105609045 A    5/2016
CN    108345411 A    7/2018
(Continued)

*Primary Examiner* — Joe H Cheng
(74) *Attorney, Agent, or Firm* — HOUTTEMAN LAW LLC

(57) ABSTRACT

Provided are a display device and a method for controlling the same. The display device includes: a display panel including a display module and a touch module, and having a first display area, a second display area and a first bending area located at a junction between the first display area and the second display area, the display panel being bendable at the first bending area; and a bendable circuit board having a second bending area, an orthographic projection of which on the display panel overlaps the first bending area, the bendable circuit board is connected to a data driving unit and a touch driving unit, transmits a data signal of any of the first display area and the second display area to the data driving unit and transmits a touch signal of any of the first display area and the second display area to the touch driving unit.

20 Claims, 5 Drawing Sheets

(58) Field of Classification Search
CPC .. G06F 3/04166; G06F 3/0443; G06F 3/0446; G06F 2203/04102; G06F 2203/04103; G09G 2380/02; G09F 9/301; H10K 59/00; H10K 59/1315; H10K 59/40
See application file for complete search history.

(56) References Cited

U.S. PATENT DOCUMENTS

| | | | |
|---|---|---|---|
| 10,255,863 B2* | 4/2019 | Song | G09G 3/20 |
| 11,335,739 B2 | 5/2022 | Yu et al. | |
| 11,425,819 B2* | 8/2022 | Kim | H05K 1/189 |
| 2014/0065326 A1* | 3/2014 | Lee | G09F 9/301 |
| | | | 428/12 |
| 2015/0049428 A1* | 2/2015 | Lee | G06F 1/1652 |
| | | | 361/679.27 |
| 2016/0300548 A1 | 10/2016 | Seo | |

FOREIGN PATENT DOCUMENTS

| | | | | |
|---|---|---|---|---|
| CN | 109658831 A | | 4/2019 | |
| CN | 109727540 A | | 5/2019 | |
| CN | 209690889 U | | 11/2019 | |
| CN | 111755496 A | * | 10/2020 | ............ G09F 9/301 |
| KR | 20150067864 A | | 6/2015 | |
| KR | 20170049777 A | * | 5/2017 | |

\* cited by examiner

DISPLAY DEVICE AND METHOD FOR CONTROLLING THE SAME

CROSS-REFERENCE TO RELATED PATENT APPLICATION

This application is the National Stage filed under 35 USC § 371 of PCT/CN2021/123072 filed on Oct. 11, 2021, which claims priority under 35 U.S.C. § 119 of Chinese Application No. 202011255236.1 filed on Nov. 11, 2020, the disclosure of which is incorporated by reference.

TECHNICAL FIELD

The present disclosure relates to the field of display technology, and in particular, to a display device and a method for controlling the display device.

BACKGROUND

With continuous progress of the display technology, organic light emitting display devices (OLEDs) have been rapidly developed and applied to various products with different functions, such as OLED mobile phones and foldable mobile phones, due to their unique advantages of flexibility and foldability. Compared with the foldable mobile phone, a difficulty in development of a foldable notebook computer mainly lies in that the foldable notebook computer has a relatively large size, and there is no mature technical solution for manufacturing the foldable notebook computer with the relatively large size at present, so that the application of the foldable notebook computer with the relatively size is limited. Therefore, the display devices are desired to be improved.

SUMMARY

In a first aspect of the present disclosure, a display device is provided. The display device includes: a display panel including a display module and a touch module, the display panel having a first display area, a second display area and a first bending area located at a junction between the first display area and the second display area, the display panel being bendable at the first bending area; a data driving unit configured to control portions of the display module located in the first display area and the second display area to display; a touch driving unit configured to control touch electrode groups of the touch module located in the first display area and the second display area; a bendable circuit board having a second bending area, an orthographic projection of the second bending area on the display panel being overlapped with the first bending area in response to that the display device is in a bending state, the bendable circuit board being respectively connected with the data driving unit and the touch driving unit, and being configured to transmit a data signal in any of the first display area and the second display area to the data driving unit and transmit a touch signal in any of the first display area and the second display area to the touch driving unit. Therefore, a large-sized foldable display device with good performances of touching and displaying is achieved.

In some implementations, the display device satisfies at least one of following configurations: the data driving unit includes a first data driving unit and a second data driving unit, the first data driving unit is configured to control the portion, located in the first display area, of the display module to display, and the second data driving unit is configured to control the portion, located in the second display area, of the display module to display; the touch driving unit includes a first touch driving unit and a second touch driving unit, the first touch driving unit is configured to control a first touch electrode group of the touch module in the first display area, and the second touch driving unit is configured to control a second touch electrode group of the touch module in the second display area.

In some implementations, the display device further includes a first circuit board and a second circuit board, the first circuit board is located on a side where the first display area is located and connected with the display panel, the first data driving unit and the first touch driving unit are electrically connected with the first circuit board respectively, the second circuit board is located on a side where the second display area is located and connected with the display panel, the second data driving unit and the second touch driving unit are electrically connected with the second circuit board respectively, and the bendable circuit board is electrically connected with the first circuit board and the second circuit board. With such configurations, the performances of the display device are further improved.

In some implementations, the display panel further has a peripheral region, a pad region, and a bending region, the peripheral region is located on at least a side of the first display area and the second display area facing the data driving unit, the pad region is located on a side of the peripheral region away from the first display area and the second display area, the bending region is located between the peripheral region and the pad region and is configured to be bendable along a bending axis, and a pad transition region is provided between the bending region and the pad region, where the touch driving unit, the data driving unit and the bendable circuit board are all located in the pad transition region. With such configurations, the performances of the display device are further improved.

In some implementations, the bendable circuit board includes a plurality of metal layers, at least one of the metal layers includes a hollowed-out electrode, and the bendable circuit board satisfies at least one of following configurations: the bendable circuit board includes two metal layers, and the two metal layers are separated from each other by an insulating layer; a sum of thicknesses of the two metal layers and the insulating layer ranges from 45 µm to 55 µm; the two metal layers includes a first metal layer and a second metal layer, a first insulating layer is provided on a side of the first metal layer away from the insulating layer, a second insulating layer is provided on a side of the second metal layer away from the insulating layer, and a thickness of each of the first insulating layer and the second insulating layer ranges from 10 µm to 15 µm. With such configurations, an improved bending durability of the bendable circuit board is achieved.

In some implementations, the first touch electrode group and the second touch electrode group are not connected with each other. With such configuration, the first touch electrode group and the second touch electrode group are independently driven, so that the first display area and the second display area of the display device can perform touch or display individually.

In some implementations, the first bending area extends along a first direction, the first touch electrode group includes a plurality of first receiving electrodes each extending along a second direction, the second touch electrode group includes a plurality of second receiving electrodes each extending along the second direction, and a gap is formed between each first receiving electrode and the second receiving electrode corresponding to the first receiving electrode, and the first direction intersects the second direction. With such configurations, touch signals in the first display area and the second display area can be respectively sensed.

In some implementations, the first data driving unit includes at least two data driving elements, and the second data driving unit includes at least two data driving elements. With such configurations, the display device can have a relatively high resolution.

In some implementations, the display device further includes: a control unit and at least one fourth circuit board, where the control unit is electrically connected with the first circuit board through the fourth circuit board. With such configurations, an electrical connection between the control unit and the first circuit board can be realized, and coordinate signals can be transmitted to the control unit through the fourth circuit board, and control signals can be transmitted to the first circuit board through the fourth circuit board, so that a transmission of signals is realized.

In some implementations, each of the first circuit board, the second circuit board, and the fourth circuit board is a printed circuit board or a flexible circuit board. With such configuration, the transmission of signals can be realized by using a printed circuit board (PCB) or a flexible printed circuit (FPC) board.

In some implementations, the display panel has long sides and short sides, and the data driving unit, the touch driving unit, and the bendable circuit board are located at one of the long sides of the display panel. With such configurations, a reduced impedance can be achieved.

In some implementations, the display module and the touch module are stacked; or the touch module is positioned inside the display module.

In some implementations, the display device includes a foldable notebook computer having a foldable screen. Therefore, the foldable notebook computer can achieve good performances of touching and displaying.

In another aspect of the present disclosure, there is provided a method for controlling the display device aforementioned. The method includes: acquiring touch signals in a first display area and a second display area by a touch driving unit; converting the touch signals into coordinate signals by the touch driving unit; and converting the coordinate signals into control signals, transmitting the control signals to the data driving unit, transmitting a data signal of any of the first display area and the second display area to the data driving unit and transmitting a touch signal of any of the first display area and the second display area to the touch driving unit by the bendable circuit board. Therefore, a large-sized foldable display device with good performances of touching and displaying can be achieved.

In some implementations, the method includes: acquiring a first touch signal in the first display area by the first touch driving unit, acquiring a second touch signal in the second display area and transmitting the second touch signal to the first touch driving unit by the second touch driving unit; converting the first touch signal into a first coordinate signal and converting the second touch signal into a second coordinate signal by the first touch driving unit; and converting the first coordinate signal into a first control signal, converting the second coordinate signal into a second control signal, transmitting the first control signal to a first data driving unit, and transmitting the second control signal to a second data driving unit.

In some implementations, the transmitting the second touch signal to the first touch driver unit includes: transmitting the second touch signal to the first touch driving unit successively through the second circuit board, the bendable circuit board and the first circuit board. With such configurations, it is convenient for the first touch driving unit to convert the second touch signal into the second coordinate signal.

In some implementations, the display device includes two fourth circuit boards, both the fourth circuit boards being electrically connected with the first circuit board and the control unit, and one of the fourth circuit boards is configured to transmit the coordinate signals to the control unit, and the other of the fourth circuit boards is configured to transmit the control signals to the first circuit board. With such configurations, the electrical connection between the first circuit board and the control unit can be realized, and a transmission of the coordinate signals and the control signals can be realized.

In some implementations, the transmitting the first control signal to the first data driving unit includes transmitting the first control signal to the first data driving unit through the first circuit board, and the transmitting the second control signal to the second data driving unit includes transmitting the second control signal to the second data driving unit successively through the first circuit board, the bendable circuit board and the second circuit board. With such configurations, touching and displaying in the first display area and the second display area can be achieved.

DRAWINGS

The above and/or additional aspects and advantages of the present disclosure will become apparent and readily appreciated from the following description of the embodiments in combination with the following drawings. In the drawings.

DETAILED DESCRIPTION OF THE DISCLOSURE

Figure 1:
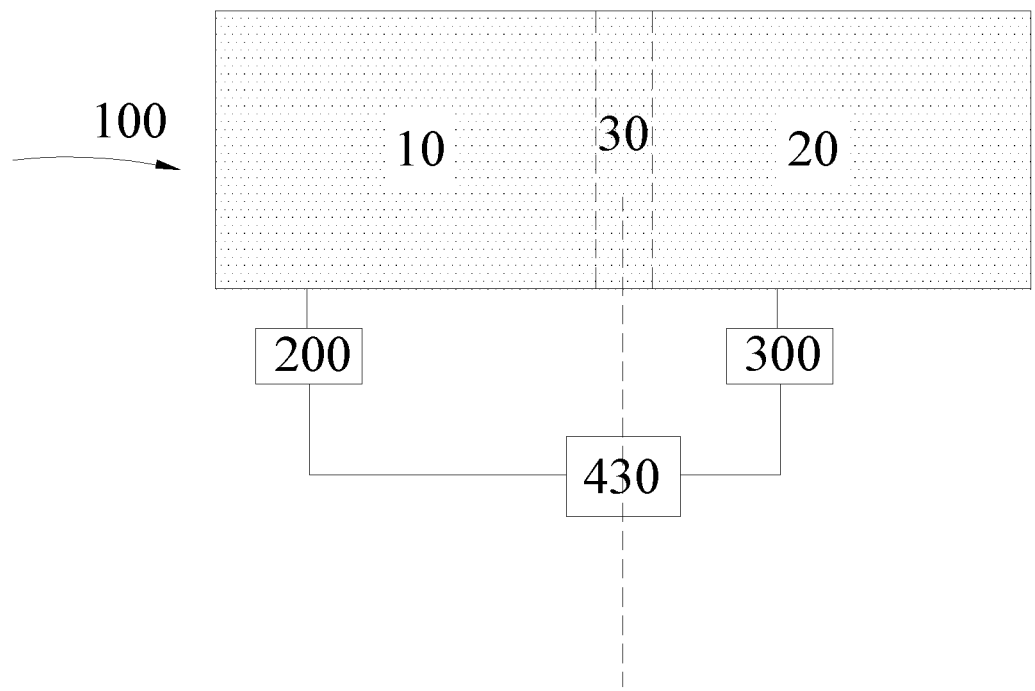
FIG. 1 shows a schematic structural diagram of a display device according to an embodiment of the present disclosure.

The embodiments of the present disclosure are described in detail below. The examples of the embodiments are shown in the drawings, in which the same or similar labels throughout represent the same or similar elements or elements with the same or similar functions. The embodiments described below with reference to the drawings are exemplary and are only used to explain the present disclosure, but cannot be understood as a limitation to the present disclosure.

In a first aspect of the present disclosure, a display device is provided. According to an embodiment of the present disclosure, referring to FIG. 1 and FIG. 4, the display device includes: a display panel 100, a data driving unit 200, a touch driving unit 300 and a bendable circuit board 430. The display panel 100 may be a display panel having a touch function, and in particular, may include a display module 110 and a touch module 120 (with reference to FIG. 4), the display panel 100 has a first display area 10 and a second display area 20, and the display panel is bendable at a first bending area 30, the first bending area 30 is located at a junction between the first display area 10 and the second display area 20. The data driving unit 200 and the touch driving unit 300 are respectively connected with the bendable circuit board 430, and the bendable circuit board 430 may be bent synchronously as the display device is in a bending state (i.e., is bent), and an orthographic projection of a second bending area of the bendable circuit board 430 on the display panel is overlapped with the first bending area in response to that the display device is in the bending state. Further, the bendable circuit board can transmit a data signal of any of the first display area and the second display area to the data driving unit and transmit a touch signal of any of the first display area and the second display area to the touch driving unit. Therefore, a large-sized foldable display device with good performances of touching and displaying is achieved.

For convenience of understanding, the following is a brief description of the principle that the display device can achieve above beneficial effects.

It is found that the driving unit of the existing small-sized (generally less than 14 inches) foldable display device (such as a foldable mobile phone having a foldable screen) is generally disposed at a short side of the display device, and only one data driving unit is configured to control the display module, one touch driving unit is configured to control the touch module, and the one touch driving unit can meet an expectation of touching and displaying on a number of channels. However, for display devices such as the large-sized (generally larger than 17.3 inches) foldable notebook computer having a foldable screen, a spacing between touch electrodes satisfying an active pen solution is generally in a range from 4 mm to 4.2 mm, and the number of channels desired for the touch driving unit is larger than $R_x 65 \times T_x 85$ ($R_x$ indicates a receiving electrode, and $T_x$ indicates a transmitting electrode), therefore the conventional touch solution cannot be applied to the large-sized foldable notebook computer.

According to the display device, the bendable circuit board capable of being bent synchronously with the display panel is provided, and the bendable circuit board is configured to transmit touch and data signals between the first display area and the second display area. For example, as shown in FIG. 1, the data driving unit 200 may be disposed at a side where the first display area 10 is located, the touch driving unit 300 may be disposed at a side where the second display area 20 is located, and a transmission of the touch and data signals between the first display area 10 and the second display area 20 may be achieved by means of a structure including the bendable circuit board 430. FIG. 1 shows only one configuration of the data driving unit 200 and the touch driving unit 300, and according to the embodiment of the present disclosure, positions of the data driving unit 200 and the touch driving unit 300 may be interchanged.

Figure 2:
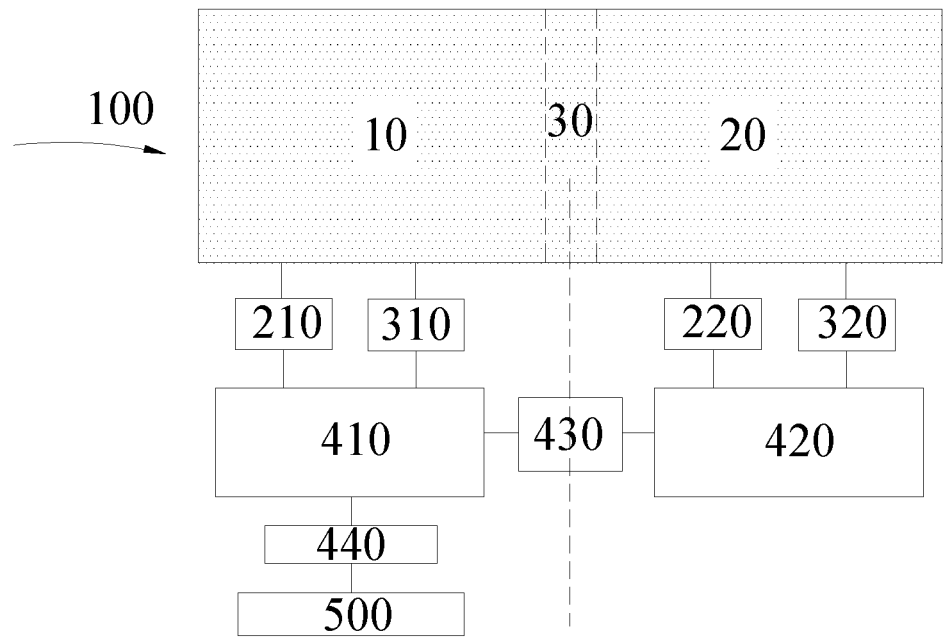
FIG. 2 shows a schematic structural diagram of a display panel according to an embodiment of the present disclosure.

Referring to FIG. 2, the display device may have two touch driving units including a first touch driving unit 310 configured to control a first touch electrode group in the first display area and a second touch driving unit 320 configured to control a second touch electrode group in the second display area, so as to meet the expectation of the large-sized display device on the number of channels for touching and displaying. In addition, two data driving units including a first data driving unit 210 configured to control the first display area to display and a second data driving unit 220 configured to control the second display area to display may be disposed in the display device. The bendable circuit board is disposed in the display device, and the bendable circuit board may be bent synchronously with the display panel in response to that the display device is bent, so that the bendable circuit board may be configured to transmit touch and data signals, and the data driving unit may be configured to control the first display area and the second display area of the display panel.

In some implementations, the first data driving unit 210 may be disposed close to the first display area 10 and configured to control a portion of the display module 110 located in the first display area 10 to display, the second data driving unit 220 is disposed close to the second display area 20 and configured to control a portion of the display module 110 located in the second display area 20 to display, the first touch driving unit 310 is disposed close to the first display area 10 and configured to control the first touch electrode group (not shown) of the touch module 120 located in the first display area 10, the second touch driving unit 320 is disposed close to the second display area 20 and configured to control the second touch electrode group (not shown) of the touch module 120 located in the second display area 20, and the first data driving unit 210 and the first touch driving unit 310 are respectively connected to the bendable circuit board 430.

Figure 6:
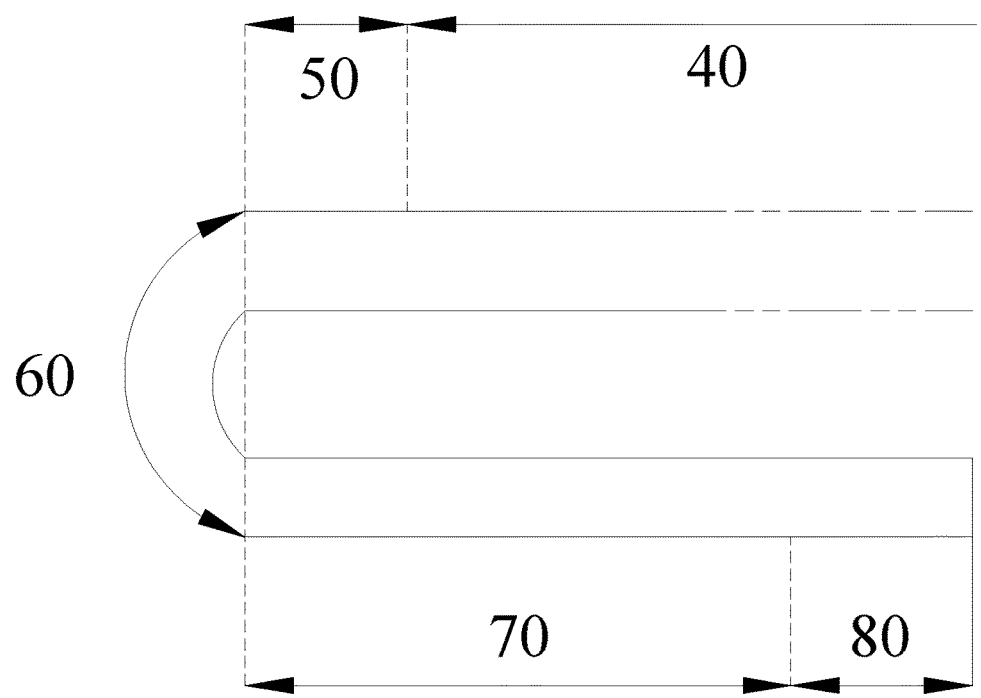
FIG. 6 shows a schematic diagram illustrating a partial structure of a display panel according to an embodiment of the present disclosure.

According to the embodiment of the present disclosure, the first data driving unit and the second data driving unit, the first touch driving unit and the second touch driving unit are all electrically connected to the bendable circuit board, and connection relationships thereof are not particularly limited. In some implementations, referring to FIG. 2 (a boundary between the first display area 10 and the second display area 20 is not shown in FIG. 2), the display panel may further have a first circuit board 410 and a second circuit board 420, the first data driving unit 210 and the first touch driving unit 310 are electrically connected to the first circuit board 410, respectively, and the second data driving unit 220 and the second touch driving unit 320 are electrically connected to the second circuit board 420, respectively. The bendable circuit board 430 is electrically connected to the first circuit board 410 and the second circuit board 420. The display device may further have a control unit 500, and the control unit 500 may be electrically connected to the first circuit board 410. Such three circuit boards are utilized to realize the transmission of touch and display signals between the first display area and the second display area, and during the display device being bent at the first bending area, the bendable circuit board being flexible may also be bent, so that the driving units and the circuit boards do not influence bending performance of the display device, and the large-sized foldable display device can achieve good performances of touching and displaying. For example, the display panel may be bonded by a Chip On Film (COF) mode, and both the first circuit board 410 and the second circuit board 420 may be flexible printed circuit (FPC) boards and may be bent toward a side away from a light emitting direction of the display panel, as shown in FIG. 6.

Figure 3:
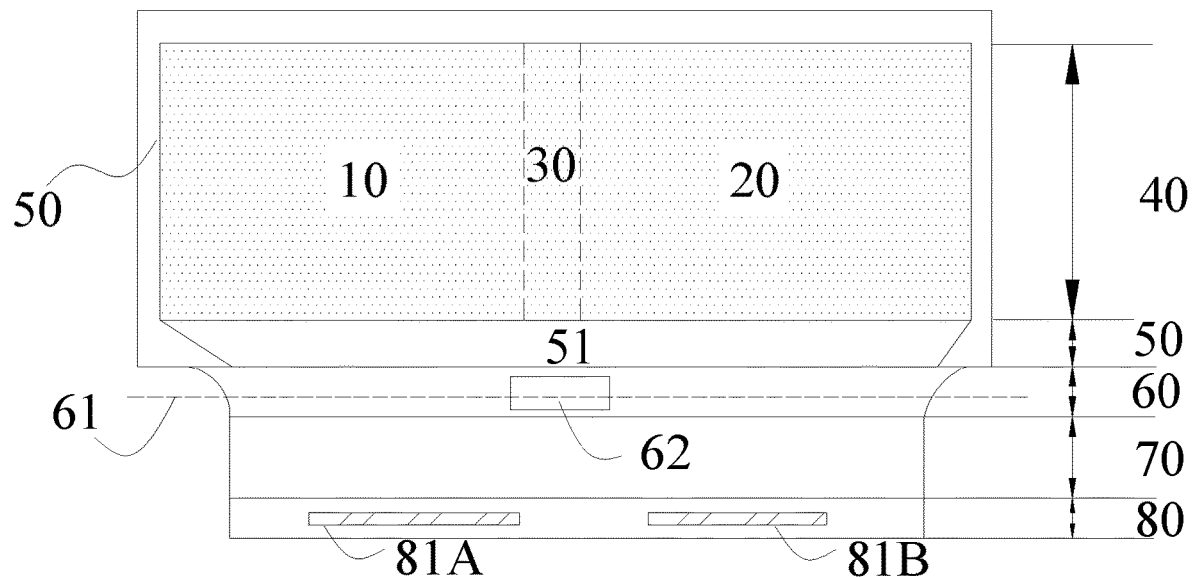
FIG. 3 shows a schematic structural diagram of a display panel according to an embodiment of the present disclosure.

Alternatively, referring to FIG. 3, the display panel may further have a display region 40, a peripheral region 50, a pad region 80 and a bending region 60, where the peripheral region 50 is located on at least a side of the first display area 10 and the second display area 20 facing the first data driving unit (not shown), i.e., a side away from the display region. A fan-out region 51 may be provided at a side of the peripheral region 50 connected with the pad region 80, and configured for fan-out of metal traces of the display region. The pad region 80 is located at a side of the peripheral region 50 away from the display region, the bending region 60 is located between the peripheral region 50 and the pad region 80 and is configured to be bendable along a bending axis 61. A pad transition region 70 is provided between the bending region 60 and the pad region 80, and structures such as the first touch driving unit, the second touch driving unit, and the bendable circuit board may be located in the pad transition region 70. Therefore, the bending region 60 which is integrated with the display panel into one piece may be used to fold the touch driving unit and the data driving unit to a surface of the display panel away from a light emitting side of the display panel. Since the bendable circuit board has a second bending area corresponding to the first bending area 30, the display device formed by including the display panel with above structures may also be foldable. Moreover, a hollowed-out region 62 may be provided in the bending region 60 at a position corresponding to the first bending area 30. Therefore, during the touch driving unit and the data driving unit are folded to the surface of the display panel away from the light emitting side, the display panel may also be folded in the bending region 60. Above driving units and the bendable circuit board may be connected to an external circuit through pad terminals 81A and 81B located in the pad region 80.

Figure 7:
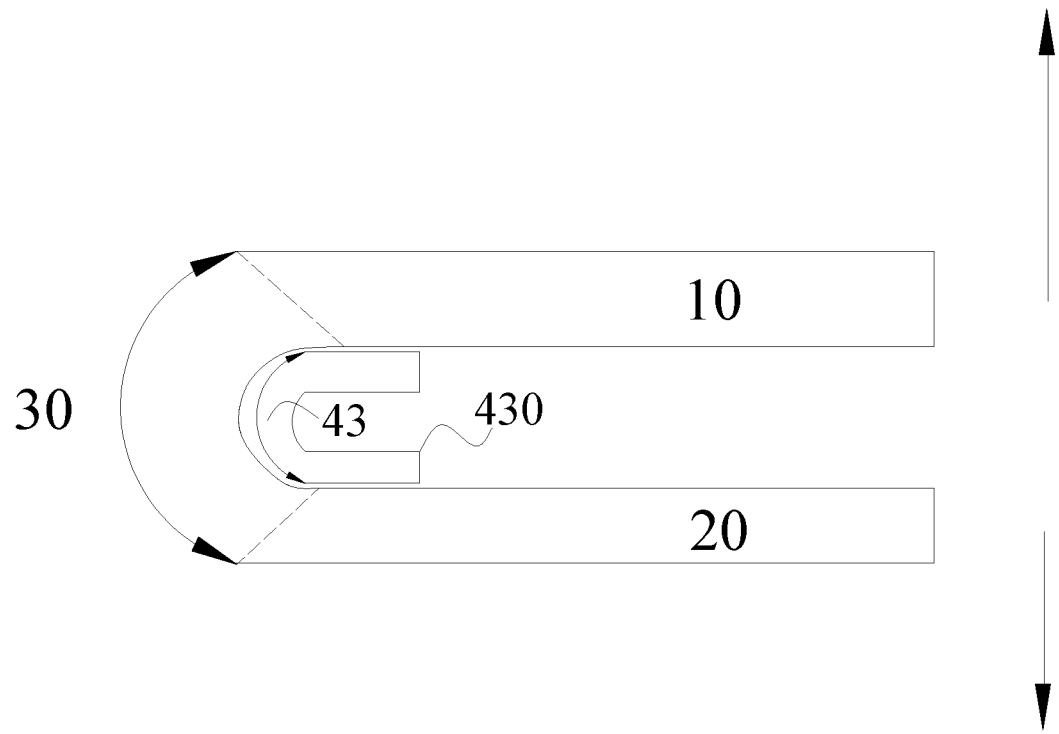
FIG. 7 shows a schematic structural diagram of a display panel according to an embodiment of the present disclosure.
Figure 8:
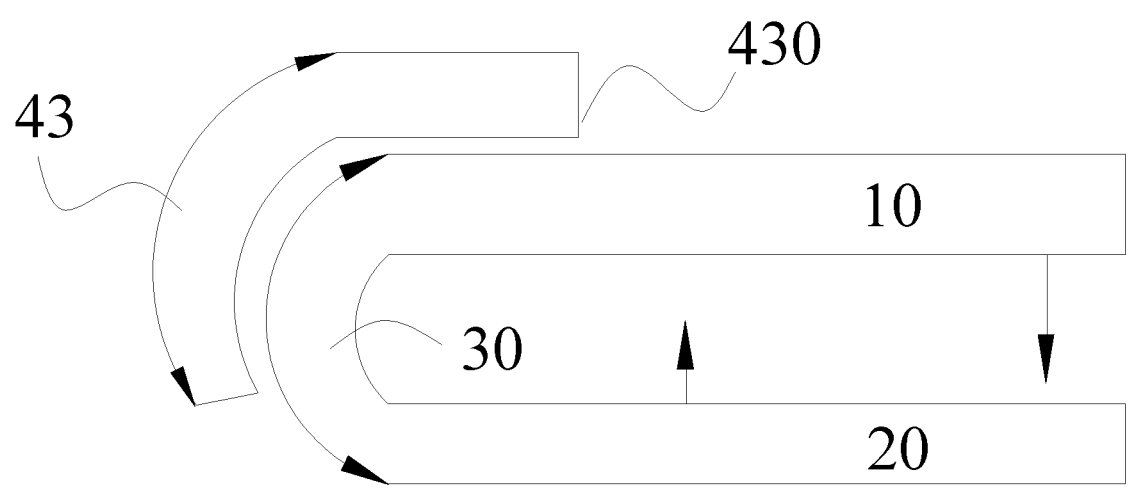
FIG. 8 shows a schematic structural diagram of a display panel according to an embodiment of the present disclosure.

According to the embodiment of the present disclosure, in a case where the display device is in the bending state (i.e., is bent), the orthographic projection of the second bending area on the display panel being overlapped with the first bending area should be understood broadly, that is, as long as a portion of the first bending area is overlapped with a portion of the second being area, the first bending area and the second bending area may be completely overlapped or partially overlapped with each other. An area of the first bending area may be larger than that of the second bending area, or smaller than that of the second bending area, or may be equal to that of the second bending area. Referring to FIGS. 7 and 8, in a case where the display device is in the bending state and light emitting sides (as indicated by arrows in the figures) of the first display area 10 and the second display area 20 of the display panel face to outside, the bendable circuit board 430 is located at an inner side of the display panel being bent. In this case, the area of the first bending area 30 may be larger than the area of the second bending area 43, and an orthographic projection of the second bending area 43 on the display panel may be completely located in the first bending area 30. In some implementations, in a case where the display device is in the bending state, and the light emitting sides of the first display area 10 and the second display area 20 of the display panel face to outside, the orthographic projection of the second bending area 43 on the display panel may also be partially overlapped with the first bending area 30 (not shown in the figures), as long as the second bending area 43 and the first bending area 30 can be bent synchronously as the display device is bent. Alternatively, referring to FIG. 8, during the display device being in the bending state, the light emitting sides (as indicated by arrows in the figure) of the first display area 10 and the second display area 20 of the display panel may also face to inside, i.e., the light emitting sides of the first display area 10 and the second display area 20 are opposite to each other. In this case, the orthographic projection of the second bending area 43 on the display panel may be partially overlapped with the first bending area 30. Similarly, in a case where the light-emitting sides of the first display area 10 and the second display area 20 are opposite to each other during the display device being in the bending state, the orthographic projection of the second bending area 43 on the display panel may be completely overlapped with the first bending area 30 (not shown in the figure).

Figure 4:
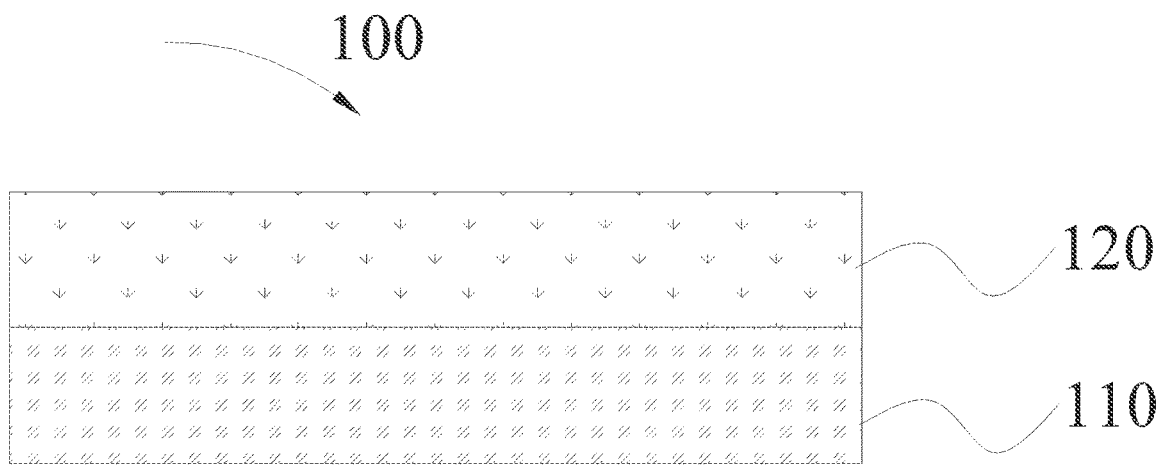
FIG. 4 shows a schematic structural diagram of a display device according to an embodiment of the present disclosure.
Figure 9:
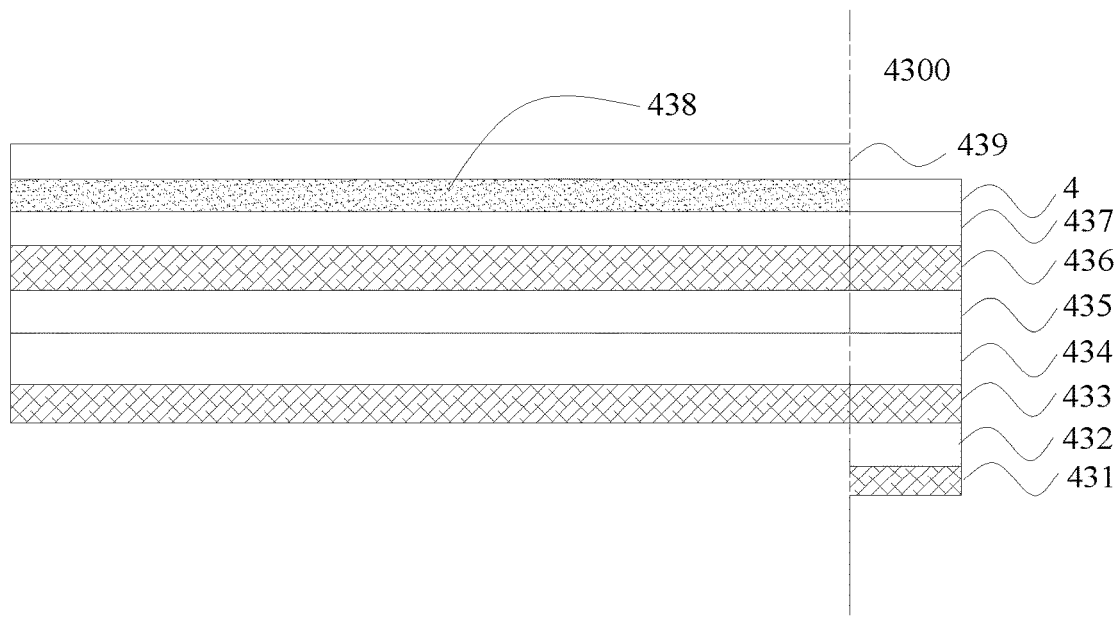
FIG. 9 shows a schematic structural diagram of a bendable circuit board according to an embodiment of the present disclosure.

According to the embodiment of the present disclosure, the bendable circuit board 430 is desired to be bent in synchronization with the display panel, and therefore the bendable circuit board 430 is desired to have a certain bending durability, that is, after being bent and restored for many times, the bendable circuit board 430 still can have a transmission function. For example, the bendable circuit board 430 may have a bending life of not less than 100 thousand times and a bending radius of about 5 mm, so that the bendable circuit board is applicable to most of electronic devices such as the foldable notebook computer. Referring to FIG. 9, the bendable circuit board may have a main body region and a gold finger region 4300, and the bendable circuit board may include a plurality of metal layers, where at least one of the metal layers includes a hollowed-out electrode. In some implementations, the bendable circuit board may include a first metal layer 437 and a second metal layer 435, and an insulating layer 436 may be provided between the first metal layer 437 and the second metal layer 435. The second metal layer 435 may be formed into the hollowed-out electrode and grounded. The first metal layer 437 may be configured to form metal traces of the bendable circuit board. A protection metal 4 may be further provided in the gold finger region 4300 to protect copper (Cu) in the gold finger region from being oxidized, for example, the protection metal may be a nickel (Ni)-containing alloy. A first insulating layer 439 may be provided on a side of the first metal layer 437 away from the insulating layer, and the first insulating layer 439 may be fixed on the side of the first metal layer 437 away from the insulating layer by a first adhesive layer 438. A second adhesive layer 434 and a second insulating layer 433 may be provided on a side of the second metal layer 435 away from the insulating layer, and in addition, a reinforcing insulating layer 431 and a reinforcing adhesive layer 432 may further be provided in the gold finger region 4300 to improve a mechanical strength of the gold finger region. A sum of thicknesses of the first metal layer, the second metal layer and the insulating layer may range from about 45 µm to about 55 µm, or further, may range from about 48 µm to about 50 µm, and the thicknesses of the first metal layer and the second metal layer may be the same or different. Taking the thicknesses of the first metal layer and the second metal layer being the same as an example, each of the thicknesses of the first metal layer and the second metal layer may range from about 10 µm to about 15 µm, or further, may range from about 12 µm to about 13 µm. In some implementations, the thickness of each of the first metal layer and the second metal layer may be about 12 µm. The insulating layer, the first insulating layer, the second insulating layer, and the reinforcing insulating layer each may be formed of polyimide (PI), and the insulating layer may have a thickness of about 25 µm. The thicknesses of the first insulating layer and the second insulating layer may be the same, and for example, each may be equal to 12.5±0.5 μm. With such configurations, the bendable circuit board has better bending durability, and the service life of the display device can be prolonged. In the present disclosure, positions of the display module and the touch module are not particularly limited, for example, the display module and the touch module may be successively stacked as shown in FIG. 4, and the touch module may be located on the light emitting side of the display module or on a side of the display module away from the light emitting side thereof. Alternatively, the touch module may be located inside the display module, for example, may be located in a package structure or the like. FIG. 4 illustrates only one structure of the present disclosure for example, and should not be construed as limiting the positions of the display module and the touch module.

In the present disclosure, the first touch driving unit and the first data driving unit are both disposed close to the first display area, and the second touch driving unit and the second data driving unit are both disposed close to the second display area, so that the touch driving unit and the data driving unit can perform driving nearby the display areas, thereby improving driving capabilities of the touch driving unit and the data driving unit.

For facilitate understanding, the following description will given by briefly describing a process of operation of the display device by taking the display device including the first circuit board, the second circuit board and the control unit as an example.

The first touch driving unit 310 detects a touch signal (i.e., first touch signal) in the first display area 10, the second touch driving unit 320 detects a touch signal (i.e., second touch signal) in the second display area 20, the second touch signal is transmitted to the first touch driving unit 310 successively through the second circuit board 420, the bendable circuit board 430 and the first circuit board 410. The first touch driving unit 310 converts the first touch signal into a first coordinate signal and converts the second touch signal into a second coordinate signal, the first coordinate signal and the second coordinate signal are transmitted to the control unit 500 through the first circuit board 410, the control unit 500 converts the first coordinate signal into a first control signal and converts the second coordinate signal into a second control signal and transmits the first control signal and the second control signal to the first circuit board 410, the first control signal is transmitted to the first data driving unit 210 through the first circuit board 410 to control the first display area 10 to achieve touch and display, and the second control signal is transmitted to the second data driving unit 220 through the first circuit board 410, the bendable circuit board 430 and the second circuit board 420 to control the second display area 20 to achieve touch and display.

According to the embodiment of the present disclosure, in a case where there is the first touch signal in the first display area 10 and there is the second touch signal in the second display area 20, the second touch signal is to be transmitted to the first touch driving unit 310 successively through the second circuit board 420, the bendable circuit board 430 and the first circuit board 410, and the first touch signal and the second touch signal are converted into coordinate signals through the first touch driving unit 310, so that signals of the first display area and the second display area can be synchronized, and occurrence of defects such as jamming during display can be prevented. For example, for a case where a finger (i.e., a touch) moves from the first display area to the second display area, the display device can realize continuous touch and display. In the present disclosure, in order to synchronize the signals of the first display area and the second display area, the second touch signal is to be transmitted to the first touch driving unit and converted into the coordinate signal in the first touch driving unit, so that the conversion from the touch signal to the coordinate signal can be realized only by the first touch driving unit, thereby simplifying the second touch driving unit.

According to the embodiment of the present disclosure, in a case where there is only a touch signal (i.e., the first touch signal) in the first display area 10, that is, there is no touch signal (i.e., there is no second touch signal) in the second display area 20, the first touch driving unit 310 only converts the first touch signal into the first coordinate signal, the first coordinate signal is transmitted to the control unit 500 through the first circuit board 410, the control unit 500 converts the first coordinate signal into a first control signal and transmits the first control signal to the first circuit board 410, and the first control signal is transmitted to the first data driving unit 210 through the first circuit board 410, so that touching and displaying are performed in the first display area.

According to the embodiment of the present disclosure, in a case where there is only a touch signal (i.e., the second touch signal) in the second display area 20, that is, there is no touch signal (i.e., there is no first touch signal) in the first display area 10, since only the first touch driving unit 310 can convert the touch signal into the coordinate signal, the second touch signal is to be transmitted to the first touch driving unit 310 successively through the second circuit board 420, the bendable circuit board 430 and the first circuit board 410, and is converted into the second coordinate signal through the first touch driving unit 310, the second coordinate signal is transmitted to the control unit 500 through the first circuit board 410, the control unit 500 converts the second coordinate signal into a second control signal, and transmits the second control signal to the first circuit board 410, the second control signal is transmitted to the second data driving unit 220 successively through the first circuit board 410, the bendable circuit board 430 and the second circuit board 420, so that touching and displaying are performed in the second display area.

The following describes in detail various portions of the display device according to the embodiment of the present disclosure.

As can be understood by those skilled in the art, the display module includes a plurality of data lines. According to the embodiment of the present disclosure, the first data driving unit 210 is configured to control a portion of the display module 110 located in the first display area 10 to perform display, and the second data driving unit 220 is configured to control a portion of the display module 120 located in the second display area 20 to perform display, that is, the first data driving unit 210 may be electrically connected to the data lines in the first display area 10, and the second data driving unit 220 may be electrically connected to the data lines in the second display area 20, so that the first display area and the second display area may be controlled to perform display.

According to the embodiment of the present disclosure, the data driving unit may include a flexible substrate and a data driving element (e.g., a Source integrated circuit, referred to as Source IC) disposed on the flexible substrate. With such configuration, driving signals may be applied to the data lines through the Source IC, and the data driving unit is formed as a flexible circuit board and can be folded to a back of the display panel to realize a narrower bezel of the display device.

According to the embodiment of the present disclosure, a Ting controller integrated circuit (T-CON IC) and a power integrated circuit (i.e., power IC) may be provided in the display device, and the T-CON IC and the power IC may be provided in the first circuit board 410. The first circuit board 410 may transmit the first control signal to the first data driving unit 210, and transmit the second control signal to the bendable circuit board 430, and then to the second data driving unit 220 through the second circuit board 420. The first circuit board 410 further has a function of performing timing control on the display device.

According to the embodiment of the present disclosure, the first data driving unit 210 may include at least two data driving elements, and the second data driving unit 220 includes at least two data driving elements, where the data driving elements in the first data driving unit 210 are electrically connected with each other, and the data driving elements in the second data driving unit 220 are electrically connected with each other. With such configurations, the display device can have a relatively high resolution.

Figure 10:
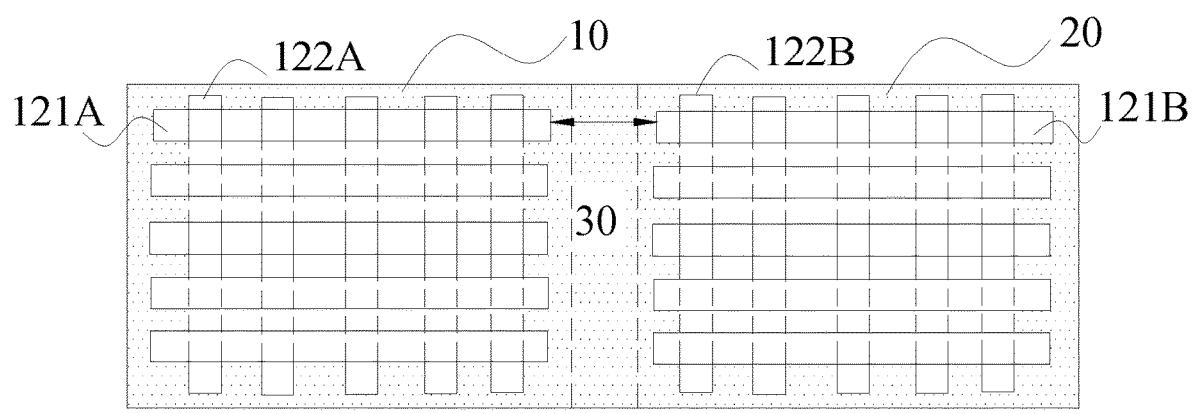
FIG. 10 shows a schematic structural diagram of a display device according to an embodiment of the present disclosure.

According to the embodiment of the present disclosure, referring to FIG. 10, a portion of the touch module located in the first display area 10 includes a first touch electrode group provided therein, a portion of the touch module located in the second display area 20 includes a second touch electrode group provided therein, the first touch driving unit 310 is electrically connected to the first touch electrode group, and the second touch driving unit 320 is electrically connected to the second touch driving electrode group, so as to control touch functions of the first display area and the second display area.

According to the embodiment of the present disclosure, the touch electrode group includes driving electrodes and sensing electrodes, and in the present disclosure, the first touch electrode group and the second touch electrode group are not connected with each other. That is to say, the first touch electrode group and the second touch electrode group of the present disclosure are individually driven, so that touching and displaying can be independently implemented in the first display area and the second display area of the display device. For example, a left hand touches the first display area and a right hand touches the second display area simultaneously, the first display area displays according to the touch signal of the left hand, the second display area displays according to the touch signal of the right hand, and displays of the first display area and the display of the second display area are not interfered with each other. In some implementations, the first bending area extends along a first direction, the first touch electrode group includes a plurality of first receiving electrodes 121A each extending along a second direction, the second touch electrode group includes a plurality of second receiving electrodes 121B each extending along the second direction, and the first direction intersects the second direction. A gap is formed between each first receiving electrode and the second receiving electrode corresponding to the first receiving electrode, as indicated by arrows in the figure. That is, the first receiving electrode is disconnected from the second receiving electrode at the first bending area 30, so that the first display area and the second display area are to be controlled by touches individually, and an accuracy of controlling by touches can be improved. It can be understood by those skilled in the art that the first touch electrode group may further include a plurality of first transmitting electrodes 122A each extending in a direction intersecting the first direction, and the second touch electrode group further includes a plurality of second transmitting electrodes 122B each extending in a direction intersecting the first direction.

According to the embodiment of the present disclosure, the touch driving unit may include a flexible substrate and a touch driving element (e.g., a touch panel IC, referred to as TP IC) disposed on the flexible substrate. Therefore, driving signals may be applied to the touch electrode group through the TP IC, and the touch driving unit is formed as a flexible circuit board and thus can be bent to the back of the display panel, so that the display device may have a relatively narrow bezel.

According to the embodiment of the present disclosure, each of the first circuit board 410 and the second circuit board 420 may be a printed circuit board (PCB) or a bendable circuit board (FPC) individually. For example, the first circuit board 410 and the second circuit board 420 may both be printed circuit boards, or the first circuit board 410 and the second circuit board 420 may both be bendable circuit boards, or one of the first circuit board 410 and the second circuit board 420 may be the printed circuit board and the other of the first circuit board 410 and the second circuit board 420 may be the bendable circuit board. Since the first touch driving unit 310 and the first data driving unit 210 are both electrically connected to the first circuit board 410, that is, the first circuit board 410 is also disposed close to the first display area 10, the second touch driving unit 320 and the second data driving unit 220 are both electrically connected to the second circuit board 420, that is, the second circuit board 420 is also disposed close to the second display area 20, and the data driving unit and the touch driving unit may be bent to the back of the display panel, so that the first circuit board and the second circuit board may also be bent to the back of the display panel along with the data driving unit and the touch driving unit. The bendable circuit board 430 is electrically connected to the first circuit board 410 and the second circuit board 420, so that the bendable circuit board may be bent to the back of the display panel along with the first circuit board and the second circuit board, so as to narrow the bezel of the display device, and during the display panel being bent, the bendable circuit board 430 may be bent accordingly, and driving units and circuit boards mentioned above do not affect the bending performance of the display device.

According to the embodiment of the present disclosure, the display module 110 has a flexible substrate, so that the display panel can be bent. A material of the flexible substrate is not particularly limited, and may be designed by those skilled in the art as desired. For example, the flexible substrate may be a polyimide (PI) substrate.

According to the embodiment of the present disclosure, referring to FIG. 2, the display device may further include at least one fourth circuit board 440 (only one fourth circuit board is shown in FIG. 1), the fourth circuit board 440 being electrically connected to the first circuit board 410 and the control unit 500, respectively. With such configurations, the control unit may be electrically connected with the first circuit board, the coordinate signal may be transmitted to the control unit through the fourth circuit board, and the control signal may be transmitted to the first circuit board through the fourth circuit board, so that the transmission of signals is achieved.

According to the embodiment of the present disclosure, the display device may have one fourth circuit board 440 (referring to FIG. 2) therein, and the fourth circuit board 440 has a channel for transmitting the coordinate signal and a channel for transmitting the control signal.

Figure 5:
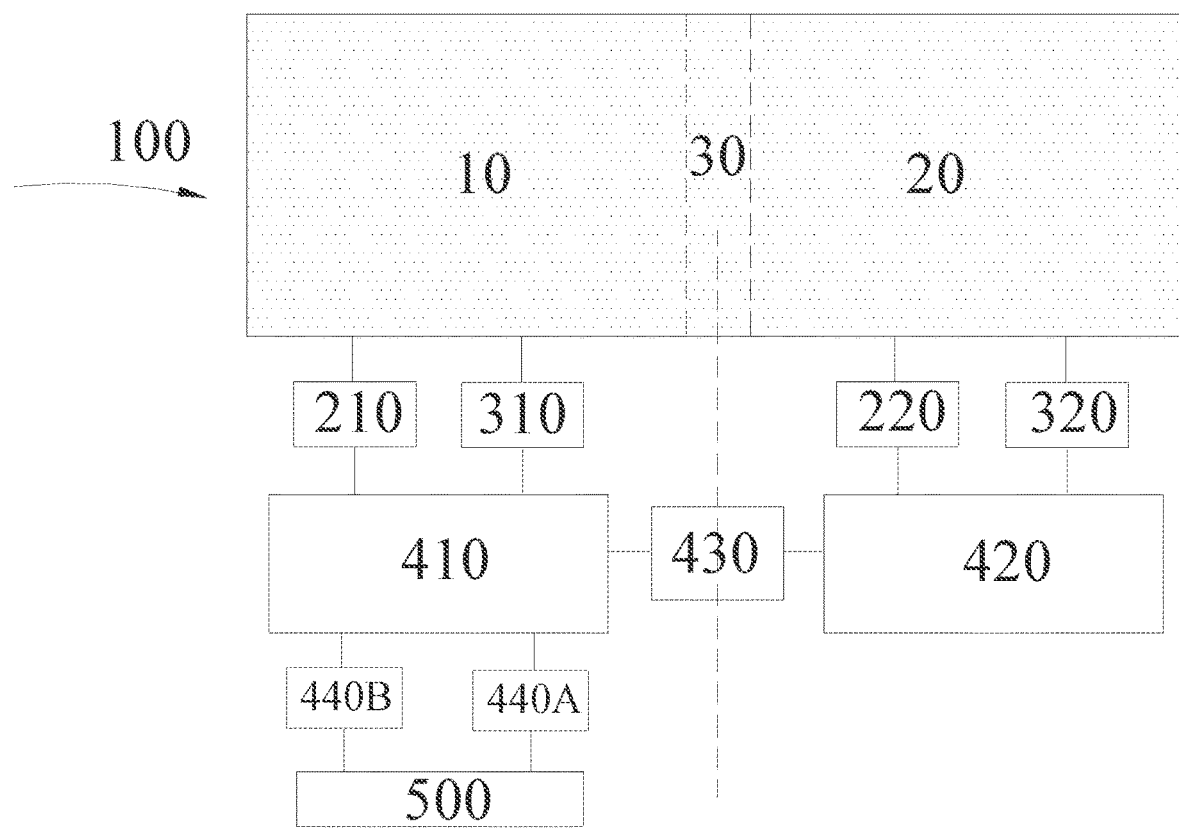
FIG. 5 shows a schematic structural diagram of a display panel according to an embodiment of the present disclosure.

According to the embodiment of the present disclosure, referring to FIG. 5, two fourth circuit boards 440 (i.e., 440A and 440B) may be provided in the display device, where one fourth circuit board 440A is configured to transmit the coordinate signal and the other fourth circuit board 440B is configured to transmit the control signal.

The type of the fourth circuit board is not particularly limited, and for example, according to the embodiment of the present disclosure, the fourth circuit board 440 may be a printed circuit board, or a flexible circuit board.

According to the embodiment of the present disclosure, the first data driving unit 210 is electrically connected to the first circuit board 410, for example, the first data driving unit 210 may be bonded to the first circuit board 410, and similarly, the second data driving unit 220 is electrically connected to the second circuit board 420, for example, the second data driving unit 220 may be bonded to the second circuit board 420. The first touch driving unit 310 is electrically connected to the first circuit board 410 by a connector or soldering, and similarly, the second touch driving unit 320 is electrically connected to the second circuit board 420 by a connector or soldering. The electrical connections between the circuit boards (e.g., the electrical connection between the first circuit board 410 and the bendable circuit board 430, the electrical connection between the bendable circuit board 430 and the second circuit board 420), and the electrical connection between the fourth circuit board and the control unit each may also be implemented by a connector or soldering.

According to the embodiment of the present disclosure, referring to FIG. 1, the display panel 100 has long sides and short sides, and the first data driving unit 210, the second data driving unit 220, the first touch driving unit 310, the second touch driving unit 320, the first circuit board 410, the second circuit board 420, the bendable circuit board 430, and the fourth circuit board 440 are all located at one of the long sides of the display panel 100. Since a current transmission path of the large-sized display device is relatively long, by providing the driving units and the circuit boards at one of the long sides of the display panel, a impedance may be reduced, and the driving units and the circuit boards may be bent to the back of the display panel to narrow the bezel of the display device. According to the embodiment of the present disclosure, the control unit 500 is located on a main board of the display device, and the fourth circuit board bent to the back of the display panel is electrically connected to the control unit 500 on the main board.

According to the embodiment of the present disclosure, a size of the display panel 100 is greater than 17.3 inches. Therefore, a large-sized foldable display device with good performances of touching and displaying can be achieved.

According to the embodiment of the present disclosure, the display device may be a foldable notebook computer including a foldable screen. Therefore, the foldable notebook computer can achieve good performances of touching and displaying, and forms and application scenes of the foldable notebook computer are enriched.

In another aspect of the present disclosure, there is provided a method for controlling the display device described above. According to an embodiment of the present disclosure, the method includes: acquiring, by a touch driving unit, touch signals in a first display area and a second display area; converting, by the touch driving unit, the touch signals into coordinate signals; converting the coordinate signals into control signals and transmitting the control signals to a data driving unit by a control unit, and transmitting, by a bendable circuit board, a data signal of any of the first display area and the second display area to the data driving unit, and transmitting, by the bendable circuit board, the touch signal of any of the first display area and the second display area to the touch driving unit. Therefore, a large-sized folding display device with good performances of touching and displaying can be achieved.

The following describes the method in detail by taking an example, in which the touch driving unit includes a first touch driving unit and a second touch driving unit, and the data driving unit includes a first data driving unit and a second data driving unit, as an example.

First, in the method, a first touch signal of the touch module in the first display area is detected by the first touch driving unit, and a second touch signal of the touch module in the second display area is detected by the second touch driving unit, and the first touch signal and the second touch signal are transmitted to the first touch driving unit.

Then, the first touch driving unit converts the first touch signal into a first coordinate signal, and converts the second touch signal into a second coordinate signal.

Finally, the control unit receives the first coordinate signal and converts the first coordinate signal into a first control signal, receives the second coordinate signal and converts the second coordinate signal into a second control signal, transmits the first control signal to the first data driving unit, and transmits the second control signal to the second data driving unit, so that the display device has good performances of touching and displaying.

According to the embodiment of the present disclosure, the transmitting the second touch signal to the first touch driving unit may include: transmitting the second touch signal to the first touch driving unit successively through the second circuit board, the bendable circuit board and the first circuit board, so that the first touch driving unit converts the second touch signal into the second coordinate signal.

According to the embodiment of the present disclosure, the display device may include two fourth circuit boards, and both the two fourth circuit boards are electrically connected to the first circuit board and the control unit, thereby an electrical connection between the first circuit board and the control unit can be achieved. During a signal transmission process, the coordinate signal is transmitted to the control unit 500 through one of the fourth circuit boards (e.g., the fourth circuit board 440A), and the control signal is transmitted to the first circuit board 410 through the other of the fourth circuit boards (e.g., the fourth circuit board 440B) (referring to FIG. 3). Thus, the transmission of the coordinate signal and the control signal can be achieved.

According to the embodiment of the present disclosure, the transmitting the first control signal to the first data driving unit may include: transmitting the first control signal to the first data driving unit through the first circuit board, so that touching and displaying are achieved in the first display area. The transmitting the second control signal to the second data driving unit may include: transmitting the second control signal to the second data driving unit successively through the first circuit board, the bendable circuit board and the second circuit board, so that touching and displaying are achieved in the second display area.

According to the embodiment of the present disclosure, in a case where there is a first touch signal in the first display area and there is a second touch signal in the second display area, the second touch signal is to be transmitted to the first touch driving unit successively through the second circuit board, the bendable circuit board and the first circuit board, the first touch driving unit converts the first touch signal into a first coordinate signal and converts the second touch signal into a second coordinate signal, the first coordinate signal and the second coordinate signal are transmitted to the control unit successively through the first circuit board and the fourth circuit board 440A, the control unit converts the first coordinate signal into a first control signal and converts the second coordinate signal into a second control signal, the first control signal and the second control signal are transmitted to the first circuit board through the fourth circuit board 440B, the first control signal is transmitted to the first data driving unit through the first circuit board, so that touching and displaying are achieved in the first display area, and the second control signal is transmitted to the second data driving unit successively through the first circuit board, the bendable circuit board and the second circuit board, so that touching and displaying are achieved in the second display area. Therefore, touching and displaying can be achieved in both the first display area and the second display area, the signals of the first display area and the second display area can be synchronized, and the defect such as jamming during display is prevented.

According to the embodiment of the disclosure, in a case there is a touch signal (i.e., the first touch signal) only in the first display area, that is, there is no touch signal (i.e., there is no second touch signal) in the second display area, the first touch driving unit only converts the first touch signal into a first coordinate signal, and transmits the first coordinate signal to the control unit through the first circuit board and the fourth circuit board 440A, the control unit converts the first coordinate signal into the first control signal, and transmits the first control signal to the first circuit board through the fourth circuit board 440B, and the first control signal is transmitted to the first data driving unit through the first circuit board, so that touching and displaying are achieved in the first display area.

According to the embodiment of the present disclosure, in a case there is a touch signal (i.e., the second touch signal) only in the second display area, that is, there is no touch signal (i.e., there is no first touch signal) in the first display area, the second touch signal is transmitted to the first touch driving unit successively through the second circuit board, the bendable circuit board, and the first circuit board, and is converted into the second coordinate signal by the first touch driving unit, the second coordinate signal is transmitted to the control unit through the first circuit board and the fourth circuit board 440A, the control unit converts the second coordinate signal into the second control signal, and transmits the second control signal to the first circuit board through the fourth circuit board 440B, and the second control signal is transmitted to the second data driving unit successively through the first circuit board, the bendable circuit board, and the second circuit board, so that touching and displaying are implemented in the second display area.

In the description of the present disclosure, the terms "upper", "lower", and the like indicate orientations or positional relationships based on those shown in the drawings, which are merely for convenience of describing the present disclosure and do not require that the present disclosure must be constructed and operated in the orientations, and thus, should not be construed as limiting the present disclosure.

In the description of the present disclosure, the description of reference terms "an embodiment", "the embodiment" and the like means that the features, structures, materials or features described in combination with the embodiment are included in at least one embodiment of the present disclosure. In this specification, the illustrative expression of the above terms does not refer to the same embodiment or example. Furthermore, the features, structures, materials, or features described may be combined in an appropriate manner in any one or more embodiments or examples. In addition, those skilled in the art can combine different embodiments or examples described in this specification and combine the features of different embodiments or examples without contradiction. In addition, it should be noted that, in the present disclosure, the terms "first" and "second" are only configured for the purpose of description and cannot be understood as indicating or implying relative importance or implicitly indicating the number of indicated technical features.

Although embodiments of the present disclosure have been shown and described above, it will be understood that the above embodiments are exemplary and not to be construed as limiting the present disclosure, and changes, modifications, substitutions and alterations may be made to the embodiments by those of ordinary skill in the art within the scope of the present disclosure.

What is claimed is:

1. A display device, comprising:
a display panel comprising a display module and a touch module, the display panel having a first display area, a second display area and a first bending area located at a junction between the first display area and the second display area, the display panel being capable of being bent at the first bending area;
a data driving unit configured to control portions of the display module located in the first display area and the second display area to display;
a touch driving unit configured to control touch electrode groups of the touch module located in the first display area and the second display area; and
a bendable circuit board having a second bending area, an orthographic projection of the second bending area on the display panel being overlapped with the first bending area during the display device being bent,
wherein the bendable circuit board is connected with the data driving unit and the touch driving unit respectively, and transmits a data signal in any of the first display area and the second display area to the data driving unit and transmits a touch signal in any of the first display area and the second display area to the touch driving unit.

2. The display device according to claim 1, wherein at least one of following configurations is satisfied:
the data driving unit comprises a first data driving unit and a second data driving unit, the first data driving unit is configured to control the portion, located in the first display area, of the display module to display, and the second data driving unit is configured to control the portion, located in the second display area, of the display module to display;
the touch driving unit comprises a first touch driving unit and a second touch driving unit, the first touch driving unit is configured to control a first touch electrode group of the touch module in the first display area, and the second touch driving unit is configured to control a second touch electrode group of the touch module in the second display area.

3. The display device according to claim 2, further comprising a first circuit board and a second circuit board,
the first circuit board is located on a side where the first display area is located and is connected with the display panel, the first data driving unit and the first touch driving unit are respectively electrically connected with the first circuit board, the second circuit board is located on a side where the second display area is located and is connected with the display panel, the second data driving unit and the second touch driving unit are electrically connected with the second circuit board, and the bendable circuit board is electrically connected with the first circuit board and the second circuit board respectively.

4. The display device according to claim 2, wherein the first touch electrode group and the second touch electrode group are not connected with each other.

5. The display device according to claim 4, wherein the first bending area extends along a first direction, the first touch electrode group comprises a plurality of first receiving electrodes each extending along a second direction, the second touch electrode group comprises a plurality of second receiving electrodes each extending along the second direction, and a gap is formed between each first receiving electrode and the second receiving electrode corresponding to the first receiving electrode, and the first direction intersects the second direction.

6. The display device according to claim 2, wherein the first data driving unit comprises at least two data driving elements, and the second data driving unit comprises at least two data driving elements.

7. The display device according to claim 2, further comprising:

a control unit and at least one fourth circuit board, wherein the control unit is electrically connected with the first circuit board through the fourth circuit board.

8. The display device according to claim 7, wherein each of the first circuit board, the second circuit board, and the fourth circuit board is a printed circuit board or a flexible circuit board.

9. The display device according to claim 1, wherein the display panel further has a peripheral region, a pad region, and a bending region, the peripheral region is located on at least a side of the first display area and the second display area facing the data driving unit, the pad region is located on a side of the peripheral region away from the first display area and the second display area, the bending region is located between the peripheral region and the pad region and is configured to be bent along a bending axis, and a pad transition region is provided between the bending region and the pad region, the touch driving unit, the data driving unit and the bendable circuit board are all located in the pad transition region.

10. The display device according to claim 1, wherein the bendable circuit board comprises a plurality of metal layers, at least one of the metal layers comprises a hollowed-out electrode, and the bendable circuit board satisfies at least one of following configurations:

the bendable circuit board comprises two metal layers, and the two metal layers are separated from each other by an insulating layer;

a sum of thicknesses of the two metal layers and the insulating layer ranges from 45 µm to 55 µm;

the two metal layers comprises a first metal layer and a second metal layer, a first insulating layer is provided on a side of the first metal layer away from the insulating layer, a second insulating layer is provided on a side of the second metal layer away from the insulating layer, and a thickness of each of the first insulating layer and the second insulating layer ranges from 10 µm to 15 µm.

11. The display device according to claim 1, further comprising:

a control unit and at least one fourth circuit board, wherein the control unit is electrically connected with the first circuit board through the fourth circuit board.

12. The display device according to claim 11, wherein each of the first circuit board, the second circuit board, and the fourth circuit board is a printed circuit board or a flexible circuit board.

13. The display device according to claim 1, wherein the display panel has long sides and short sides, and the data driving unit, the touch driving unit, and the bendable circuit board are all located at one of the long sides of the display panel.

14. The display device according to claim 1, wherein the display module and the touch module are stacked; or the touch module is located inside the display module.

15. The display device according to claim 1, comprising: a foldable notebook computer with a foldable screen.

16. A method for controlling the display device according to claim 1, comprising:

acquiring, by the touch driving unit, touch signals in the first display area and the second display area;

converting, by the touch driving unit, the touch signals into coordinate signals; and converting the coordinate signals into control signals, transmitting the control signals to the data driving unit, transmitting, by the bendable circuit board, a data signal of any of the first display area and the second display area to the data driving unit, and transmitting, by the bendable circuit board, a touch signal of any of the first display area and the second display area to the touch driving unit.

17. The method according to claim 16, comprising:

acquiring a first touch signal in the first display area by a first touch driving unit, acquiring a second touch signal in the second display area and transmitting the second touch signal to the first touch driving unit by a second touch driving unit;

converting the first touch signal into a first coordinate signal and converting the second touch signal into a second coordinate signal by the first touch driving unit; and converting the first coordinate signal into a first control signal, converting the second coordinate signal into a second control signal, transmitting the first control signal to a first data driving unit, and transmitting the second control signal to a second data driving unit.

18. The method according to claim 17, wherein the transmitting the second touch signal to the first touch driving unit comprises: transmitting the second touch signal to the first touch driving unit successively through a second circuit board, the bendable circuit board and a first circuit board.

19. The method according to claim 17, wherein the display device comprises two fourth circuit boards, both the fourth circuit boards being electrically connected with a first circuit board and a control unit, and one of the fourth circuit boards is configured to transmit the coordinate signals to the control unit, and the other of the fourth circuit boards is configured to transmit the control signals to the first circuit board.

20. The method according to claim 17, wherein the transmitting the first control signal to the first data driving unit comprises: transmitting the first control signal to the first data driving unit through a first circuit board,
the transmitting the second control signal to the second data driving unit comprises: transmitting the second control signal to the second data driving unit successively through the first circuit board, the bendable circuit board and a second circuit board.

* * * * *